(12) United States Patent
Lee et al.

(10) Patent No.: US 8,223,408 B2
(45) Date of Patent: Jul. 17, 2012

(54) IMAGE FORMING APPARATUS HAVING SCANNING FUNCTION AND SCANNING METHOD THEREOF

(75) Inventors: Byoung Bag Lee, Seoul (KR); Nam Ik Cho, Seoul (KR); Sung Hoon Lee, Seongnam (KR)

(73) Assignee: Sindoh Co., Ltd. (KR)

( * ) Notice: Subject to any disclaimer, the term of this patent is extended or adjusted under 35 U.S.C. 154(b) by 468 days.

(21) Appl. No.: 12/567,827

(22) Filed: Sep. 28, 2009

(65) Prior Publication Data

US 2010/0296136 A1    Nov. 25, 2010

(30) Foreign Application Priority Data

May 19, 2009  (KR) .................. 10-2009-0043485

(51) Int. Cl.
*H04N 1/04*  (2006.01)
*G06K 9/00*  (2006.01)
*G06K 9/36*  (2006.01)

(52) U.S. Cl. ......... 358/488; 358/474; 382/284; 382/124
(58) Field of Classification Search .................. 358/488, 358/474; 382/284, 124
See application file for complete search history.

(56) References Cited

U.S. PATENT DOCUMENTS

| 8,144,947 | B2 * | 3/2012 | Kletter | 382/124 |
| 2009/0244651 | A1 * | 10/2009 | Aoshima | 358/474 |

* cited by examiner

*Primary Examiner* — Charlotte M Baker
*Assistant Examiner* — Rury Grisham
(74) *Attorney, Agent, or Firm* — Harness, Dickey & Pierce, P.L.C.

(57) ABSTRACT

An image forming apparatus is capable of scanning a document having a larger size than the flat. For example, it is possible to scan an A3 document using a scanning sensor having a slight larger size than an A4 document, and also it is possible to obtain a high quality of the A3 document image.

18 Claims, 10 Drawing Sheets

(a)

(b)

IMAGE FORMING APPARATUS HAVING SCANNING FUNCTION AND SCANNING METHOD THEREOF

CROSS-REFERENCE TO RELATED APPLICATIONS

The present invention claims priority of Korean Patent Application No. 10-2009-0043485, filed on May 19, 2009, which is incorporated herein by reference.

BACKGROUND OF THE INVENTION

1. Field of the Invention

The present invention relates to an image forming apparatus a function of scanning a document having a larger size than a flat glass and a scanning method thereof; and, more particularly, to an image forming apparatus which scans a part of an A3-sized document loaded on a flat glass using a scanning sensor having a slightly larger size than an A4 size and moves the A3-sized document so as to scan the rest part thereof and then composes the scanned images, thereby producing an image of the A3-sized document, and a scanning method thereof.

2. Description of Related Art

Generally, an image forming apparatus is a device for printing an input image signal on a printing medium, and classified into a printer, a duplicator, a multi-function printer in which the functions thereof are combined in a single body and the like.

The image forming apparatus includes a scanning part for scanning an image recorded on a document. In order for the scanning part to read information from the document, it is necessary to move a scanning sensor of the scanning part or the document.

Therefore, there are two types for scanning the document, one is a flat bed type in which the scanning sensor is moved in a state that the document is fixed, and the other is a sheet feed type in which the document is moved in a state that the scanning sensor is fixed. Recently, the multi-function printer employs the above-mentioned two types, and FIG. 1 shows an example of such image forming apparatus.

As shown in FIG. 1, the image forming apparatus 50 includes a cover 10 and a main body 30. An automatic document feeder 20 is disposed at the cover 10, and a scanning sensor 40 is disposed at the main body 30 to scan a document fed from the automatic document feeder 20.

The scanning sensor 40 may include a CCM module (CCDM) having a charge coupled device as one of image pickup devices which forms an image of a subject using an electric charge, and a CMOS image sensor (CIS) which scans the document.

The automatic document feeder 20 has a C-shaped passage P for feeding the documents. The documents loaded on a document platform 21 are guided to an upper side of the scanning sensor 40 through a pickup roller 22, a transferring roller 23 and a feeding roller 24. Then, the documents are scanned by the scanning sensor 40 and discharged through a discharging roller 25. As described above, it is possible to facilely scan a large amount of documents using the automatic document feeder 20.

Further, the document may be scanned without the automatic document feeder 20. To this end, after opening the cover 10, the document is aligned on a flat glass 31 disposed at an upper surface of the main body 30, and the scanning operation is performed. Then, the scanning sensor 40 is reciprocated at a lower side of the scanning window in an arrow direction A. Therefore, while the scanning sensor 40 is moved, a single sheet of the document can be scanned without the automatic document feeder 20.

Meanwhile, in the conventional multi-function printer, since the scanning sensor 40 is set on the basis of an A4 size which is most widely used, an image forming apparatus for the A3 size is needed to scan an A3-sized document which is larger than the A4 size.

However, since the image forming apparatus for the A3 size has a scanning sensor twice larger than that of an image forming apparatus for the A4 size, a size of the flat glass and a volume of the image forming apparatus are also increased, thereby increasing a cost of the product. Thus, it is difficult to separately purchase the image forming apparatus for the A3 size, which has a low frequency of use.

SUMMARY OF THE INVENTION

An embodiment of the present invention is directed to providing an image forming apparatus which scans a part of an A3-sized document loaded on a flat glass using a scanning sensor having a slightly larger size than an A4 size and moves the A3-sized document so as to scan the rest part thereof and then composes the scanned images, thereby producing an image of the A3-sized document, and a scanning method thereof.

To achieve the object of the present invention, the present invention provides image forming apparatus having a function of scanning a document having a larger size than a flat glass, comprising a motor driving part for controlling a transferring roller driving motor which drives a transferring roller for transferring a second-sized document from a first region of the second-sized document to a second region of the second-sized document, in a scanning mode for the second-sized document larger than the first-sized document which can be scanned through the flat glass; a scanning part which scans the first region of the second-sized document loaded on the flat glass so as to have a larger width than the first-sized document and outputs a first image data, and also scans the second region of the second-sized document transferred by the transferring roller and loaded on the flat glass so as to have a larger width than the first-sized document and outputs a second image data; an image storing part for storing the first and second image data output from the scanning part; and an image composing part which performs a matching of image patterns using an overlaid region selected from the first and second image data, and overlaps images of the overlaid region so as to form an image having the same size as the second-sized document.

Preferably, the image composing part detects corners of patterns in the images of the overlaid region in order to perform the matching of the image patterns, and connects corresponding points among the corners of the overlaid region.

Preferably, the image composing part uses a Harris corner detection algorithm in the overlaid regions so as to detect the corners of the image patterns of the overlaid region.

Preferably, the image composing part performs a Gaussian blur with respect to the images of the overlaid region in order to reduce influence of noise in the overlaid region before detecting of the corners of the overlaid region.

Preferably, the Gaussian blur is carried out in a status that a floating-point operation with respect to the images of the overlaid region is changed into an integer operation.

Preferably, the image composing part forms a local descriptor which can perform the matching regardless of various changes in image rotation and size before connecting the corresponding points among the corners of the image in the overlaid region.

Preferably, the image composing part eliminates erroneous corresponding relations using a random sampling algorithm in order to find the consistent matching points according to the use of the local descriptor.

Preferably, the image composing part finds a geometric movement parameter of the images of the overlaid region after performing the matching of the image patterns.

Preferably, the overlapping of the images of the overlaid region compensates and aligns the rotation and skew using the parameter for geometric movement of the image in the overlaid region.

Preferably, the overlapping of the images of the overlaid region applies a stitching using a dynamic programming so that an overlapped portion of the overlaid regions shows less noticeable stitching boundary.

Further, the present invention provides scanning method of an image forming apparatus which comprises a flat glass on which a document to be scanned is loaded, a transferring roller for transferring the document, and a scanning sensor for scanning an image from the document loaded on the flat glass, comprising scanning a first region of a second-sized document, which is loaded on the flat glass, so as to have a larger width than a first-sized document in a scanning mode for the second-sized document larger than the first-sized document which can be scanned through the flat glass, and outputting a first image data; transferring the second-sized document from the first region of the second-sized document to the second region of the second-sized document using the transferring roller, and scanning the second region of the second-sized document transferred by the transferring roller and loaded on the flat glass so as to have a larger width than the first-sized document, and outputting a second image data; and performing a matching of image patterns using an overlaid region selected from the first and second image data, and overlapping images of the overlaid region so as to form an image having the same size as the second-sized document.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
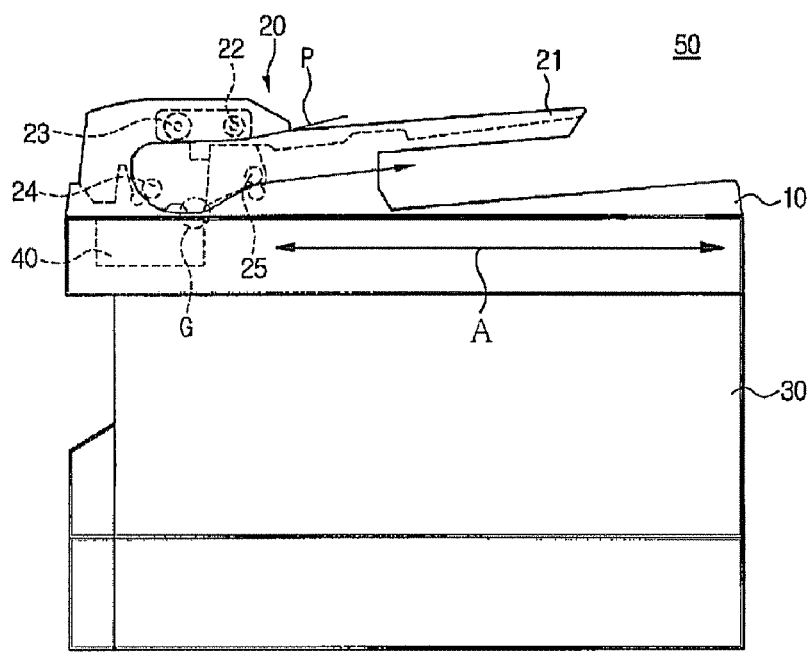
FIG. 1 is a view of an example of a conventional image forming apparatus.
Figure 2:
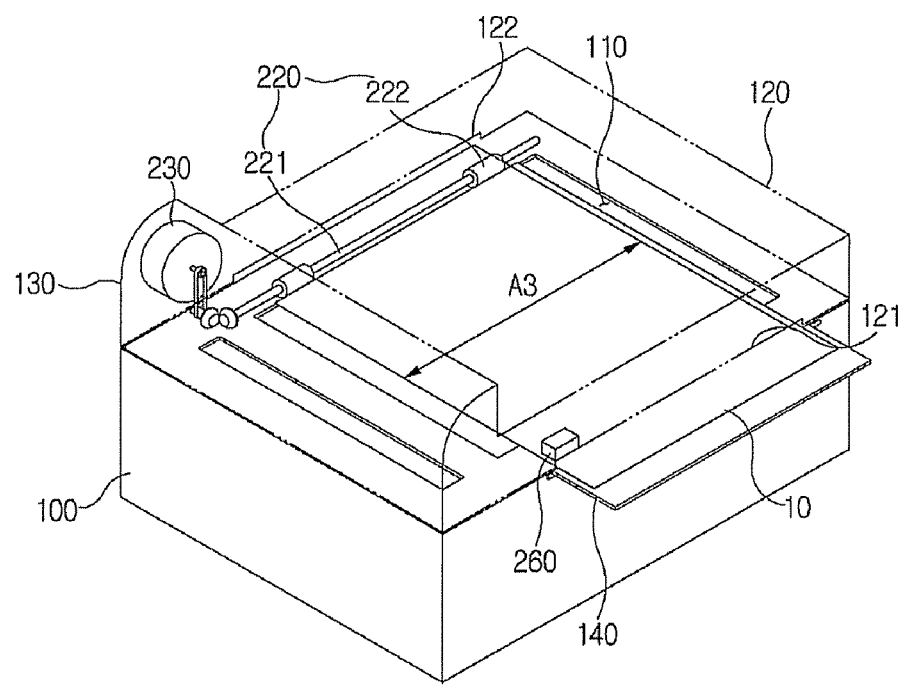
FIG. 2 is a schematic view of an image forming apparatus with a function of scanning an A3-sized document in accordance with an embodiment of the present invention.
Figure 3:
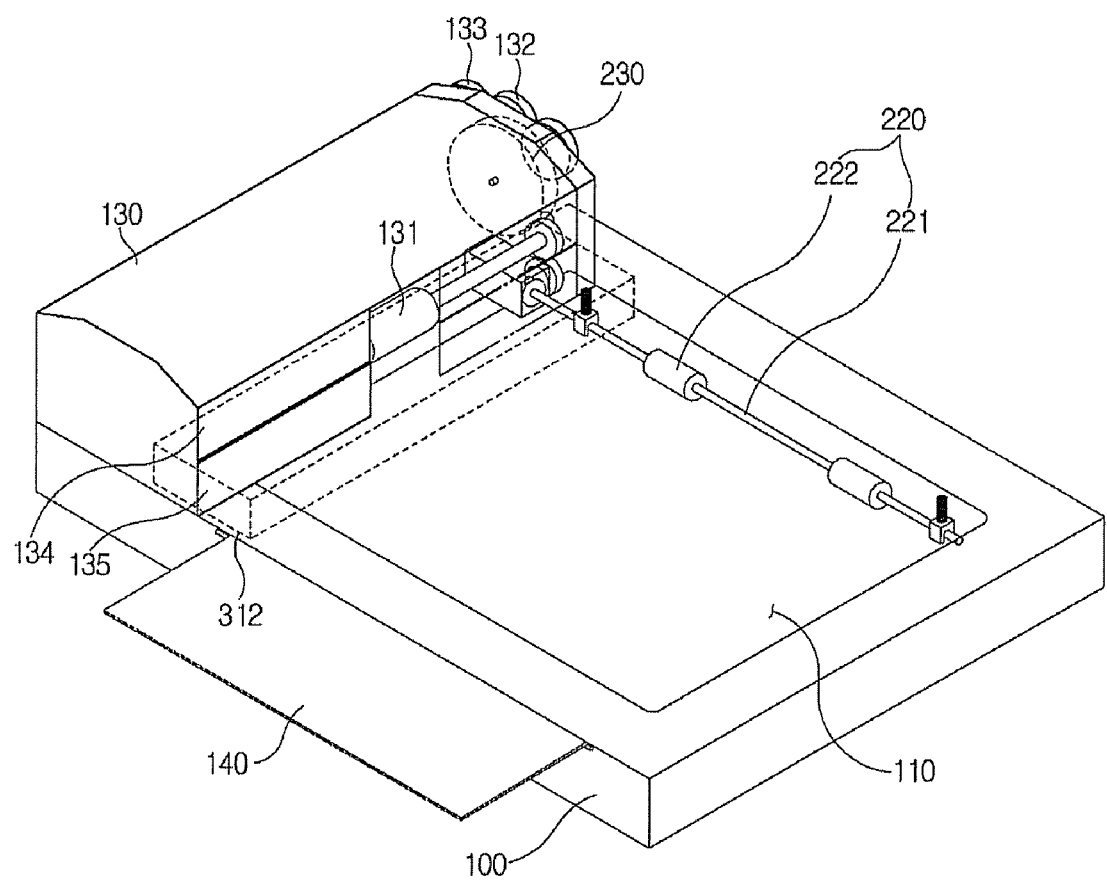
FIG. 3 is a view showing an upper side of the image forming apparatus with the function of scanning the A3-sized document in accordance with the embodiment of the present invention.
Figure 4:
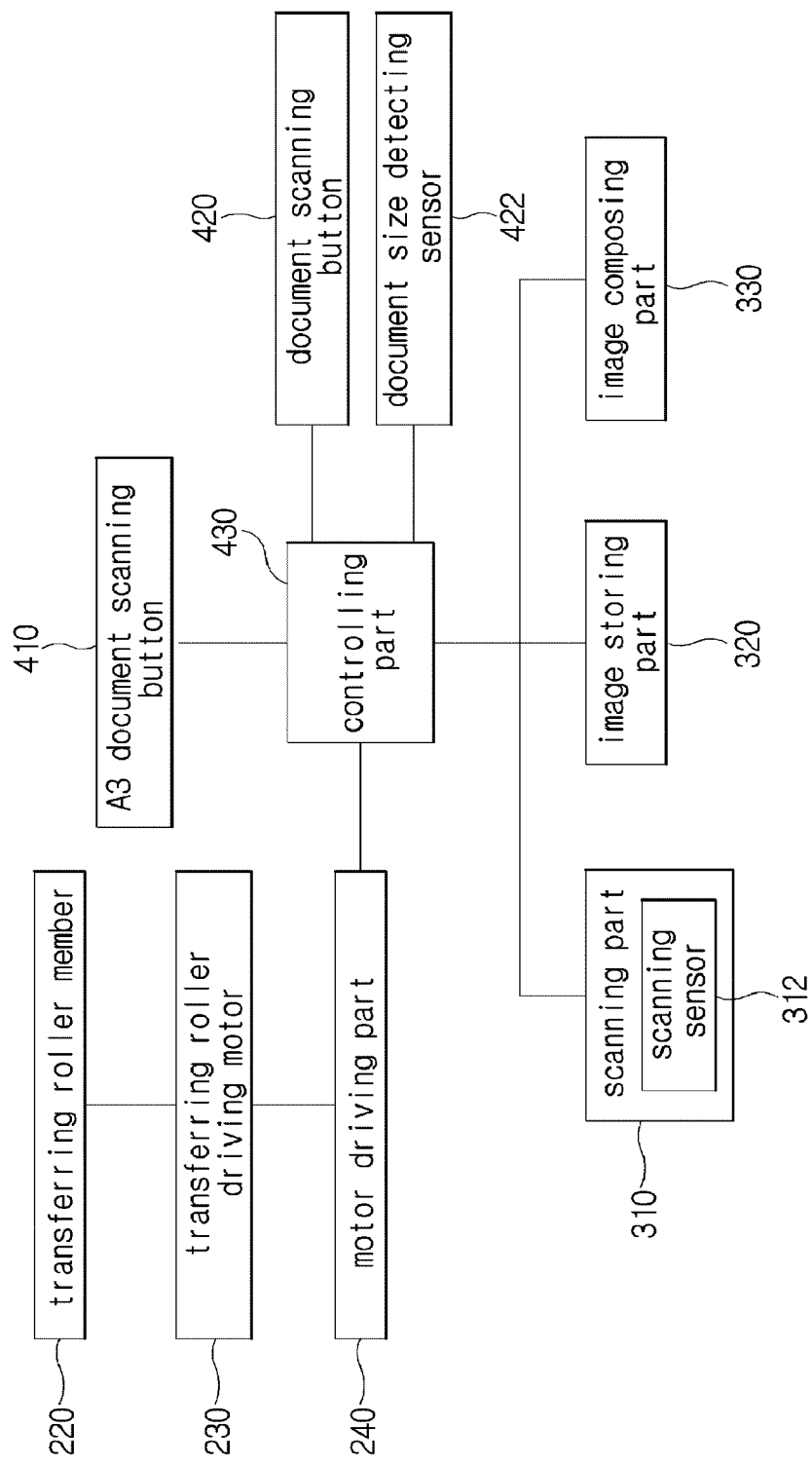
FIG. 4 is a schematic block diagram showing a construction of the image forming apparatus with the function of scanning the A3-sized document in accordance with the embodiment of the present invention.
Figure 7A:
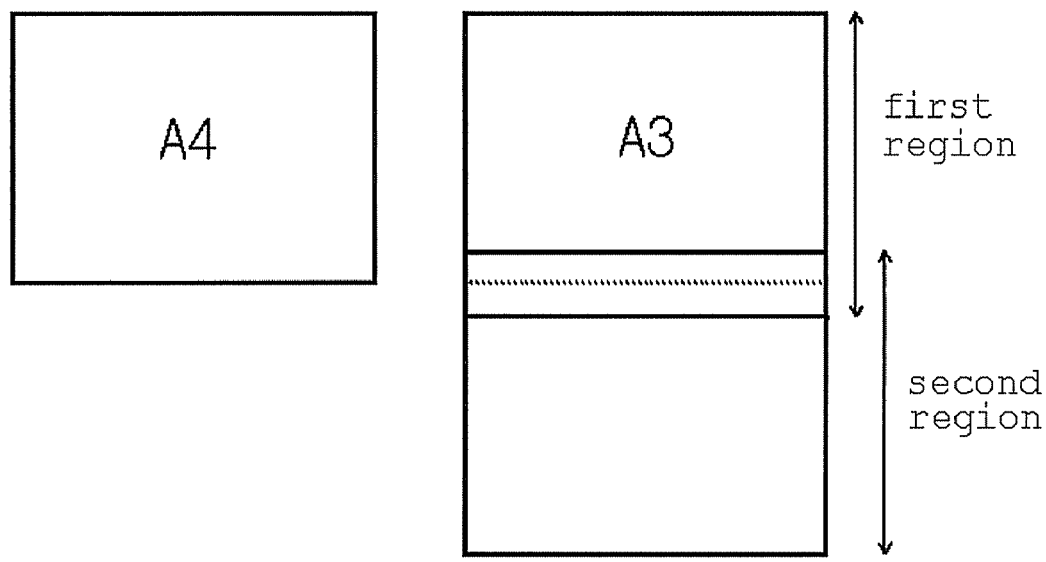
FIG. 7a is a view showing first and second regions in accordance with the embodiment of the present invention.

FIG. 2 is a schematic view of an image forming apparatus with a function of scanning an A3-sized document in accordance with an embodiment of the present invention, FIG. 3 is a view showing an upper side of the image forming apparatus with the function of scanning the A3-sized document in accordance with the embodiment of the present invention, FIG. 4 is a schematic block diagram showing a construction of the image forming apparatus with the function of scanning the A3-sized document in accordance with the embodiment of the present invention, and FIG. 7a is a view showing first and second regions in accordance with the embodiment of the present invention.

As shown in FIGS. 2 to 4, the image forming apparatus with the function of scanning the A3-sized document in accordance with the present invention includes an main body 100 having a flat glass 110 on which a document 10 is loaded, and a cover 120 which opens and closes the flat glass 110 disposed at an upper side of the main body 100 and also may further include an automatic document feeding unit 130 for feeding a large amount of documents.

The main body 100 includes a transferring roller member 220, a transferring roller driving motor 230, a motor driving part 240, a scanning part 310, an image storing part 320, an image composing part 330, an A3 document scanning button 410, a document scanning button 420, a document size detecting sensor 422 and a controlling part 430.

The image forming apparatus with the function of scanning the A3-sized document in accordance with an embodiment of the present invention includes the transferring roller member 220 for transferring the document loaded on the flat glass 100, the transferring roller driving motor 230 for driving the transferring roller member 220, and the motor driving part 240 for controlling the transferring roller driving motor 230.

The transferring roller member 220 is arranged to be orthogonal to a length direction of the automatic document feeding unit 130 and the scanning sensor 312, i.e., arranged in a transverse direction on an upper side of the flat glass 110.

More detailedly, the transferring roller member 220 includes a transferring roller shaft 221 which is disposed in a transverse direction on the upper side of the flat glass 110, and a plurality of transferring rollers 222 which are rotatably disposed at the transferring roller shaft 221.

The transferring roller member 220 having the above-mentioned construction is operated so that the document 10 introduced onto the flat glass 110 in a length direction of the scanning sensor 312 is transferred to the transferring rollers 222.

For example, if the transferring roller member 220 is operated in a state that an end of an A3 document 10 is aligned on the flat glass 100 in order to scan the A3 document 10, the A3 document 10 is transferred to the transferring roller member 220 by rotation of the transferring rollers 222.

Further, the transferring roller driving motor 230 is connected with the transferring roller member 220, i.e., the transferring roller shaft 221 so as to transmit driving force to the transferring roller shaft 221, such that the transferring rollers 222 are rotated.

Therefore, after a first region of the A3 document 10 on the flat glass 110 is scanned by the scanning sensor 312, the transferring roller driving motor 230 transmits the driving force to the transferring roller member 220 so that a second region, i.e., the rest part of the A3 document 10 which is not yet scanned is positioned on the flat glass 110. In FIG. 7a, an A4 document has a first size and the A3 document has a second size. Since the A3 document has a larger size than the A4 document, the A3 document is divided into the first and second regions and then scanned twice.

Meanwhile, in the main body 100, a supporting flap may be provided at a lower side of the flat glass 110, i.e., an opposite end to the transferring rollers 222 in order to support the A3 document. In other words, the supporting flap 140 functions to support a part of the A3 document 10 which is exposed to the outside of the main body 100 while being introduced onto the flat glass 110 to be orthogonal to the length direction of the automatic document feeding unit 130 and the scanning sensor 312.

Preferably, at a lower end of a lower side of the cover 120, i.e., a lower end adjacent to the supporting flap 140, there may be formed a document input port 121 which is formed into a desired space so that the A3 document 10 is facilely introduced onto the flat glass 110 without being caught by the end of the cover 120.

Further, at a lower end of an upper side of the cover 120, i.e., a lower end adjacent to transferring roller member 220, there may be formed a document output port 122 which is formed into a desired space so that the A3 document is facilely introduced onto the flat glass 110 without being caught by the end of the cover 120.

Owing to the document input port 121 and the document output port 122, a user can input or output the document to/from the flat glass 110 without opening and closing the cover 120.

The image forming apparatus with the function of scanning the A3-sized document in accordance with an embodiment of the present invention includes the scanning part 310 which scans a part of the A3 document 10 loaded on the flat glass 110 and outputs image data, the image storing part 320 which stores the image data output from the scanning part 310, and the image composing part 330 which performs a matching of image patterns using the image data stored in the image storing part 320 so as to generates an A3 document image.

The scanning part 310 has the scanning sensor 312 for scanning an image from the document, which includes a CCDM or CIS (CMOS Image Sensor) as a CCD module. And as shown in FIGS. 2 and 3, the scanning sensor 312 is disposed at a left upper side of the main body 100, i.e., a lower side of the automatic document feeding unit 130 which will be described later to as to scan the document fed from the automatic document feeding unit 130. Further, the scanning part 310 has a scanning sensor moving means for moving the scanning sensor 312 to left and right sides so as to scan the document 10 loaded on the flat glass 110.

Meanwhile, a general scanning sensor for scanning the A4 document is disposed to be set to a short side of the A4 document. However, it is preferable that the scanning sensor 312 applied to the present invention has a larger length (about 10 mm to 30 mm) than the short side (210 mm) of the A4 document.

If a document loaded on the flat glass 110 has the A4 size, the scanning part 310 can output image data of the A4 size using the scanning sensor 312, and if the document has the A3 size, it can output image data having a large size than the A4 size using the scanning sensor 312.

The image storing part 320 may include DRAM and the like so as to store the image data output from the scanning part 310.

The image composing part 330 carries out an image processing operation for composing two images scanned through the scanning part 310 and then generates a scanned image of the A3 size.

As described above, the image forming apparatus with the function of scanning the A3-sized document in accordance with the present invention can obtain an image of the A3 document by scanning the A3 document twice using the scanning sensor 312 having a slight larger than the A4 size and then composing the scanned images.

The image forming apparatus with the function of scanning the A3-sized document in accordance with the present invention includes the A3 document scanning button 410 which outputs an signal for performing an A3 document scanning function, and the controlling part which outputs a signal according to the signal of the A3 document scanning button 410 so that the scanning part 310 scans the A3 document. Meanwhile, the function of the A3 document scanning button 410 can be obtain through the document scanning button 420 which outputs a signal for performing a document scanning function and the document size detecting sensor 422 for detecting a size of a document loaded on the flat glass 110.

Although not shown in the drawing, the A3 document scanning button 410 is formed at one side of the main body 100 so as to be pushed by a user, and functions to output the signal to the controlling part 430 so that the A3 document 10 loaded on the flat glass 110 through the document input port 121 is scanned.

Further, when the signal from the document scanning button 420 is output, the document size detecting sensor 422 provided at the document input port 121 detects a size of the document introduced through the document input port 121. At this time, if the document aligned on the flat glass 110 is exposed to the outside through the document input port 121, and then this status is detected by the document size detecting sensor 422, it is determined by the controlling part 430 that the document has the A3 size. And if the document aligned on the flat glass 110 is not exposed to the outside through the document input port 121, it is determined by the controlling part 430 that the document has the A4 size.

The controlling part 430 receives a signal output from the A3 document scanning button 410 or the document scanning button 420 and the document size detecting sensor 422 and then outputs a signal for driving the scanning sensor 312 and the transferring roller driving motor 230 so as to scan a document when the document has the A3 size. Further, the controlling part 430 controls the image storing part 320 so as to store the scanned images and also controls the image composing part 330 so as to compose the scanned images stored in the image storing part 320.

The automatic document feeding unit 130 is disposed at a left side of the cover 120, i.e., at an upper side of the scanning sensor 312 so as to automatically feed and discharge a large amount of documents. In detail, the automatic document feeding unit 130 has a plurality of feeding rollers 131, 132 and 133 and discharges the documents fed through a feeding part 134 to the outside through a discharging part 135. Meanwhile, the transferring roller driving motor 230 transfers driving force to the feeding rollers 131, 132 and 133 via a connecting member.

At this time, the scanning sensor 312 is fixed at a lower side of the automatic document feeding unit 130 so as to scan the fed documents. Therefore, the documents are scanned without being loaded on the flat glass 110.

Figure 5:
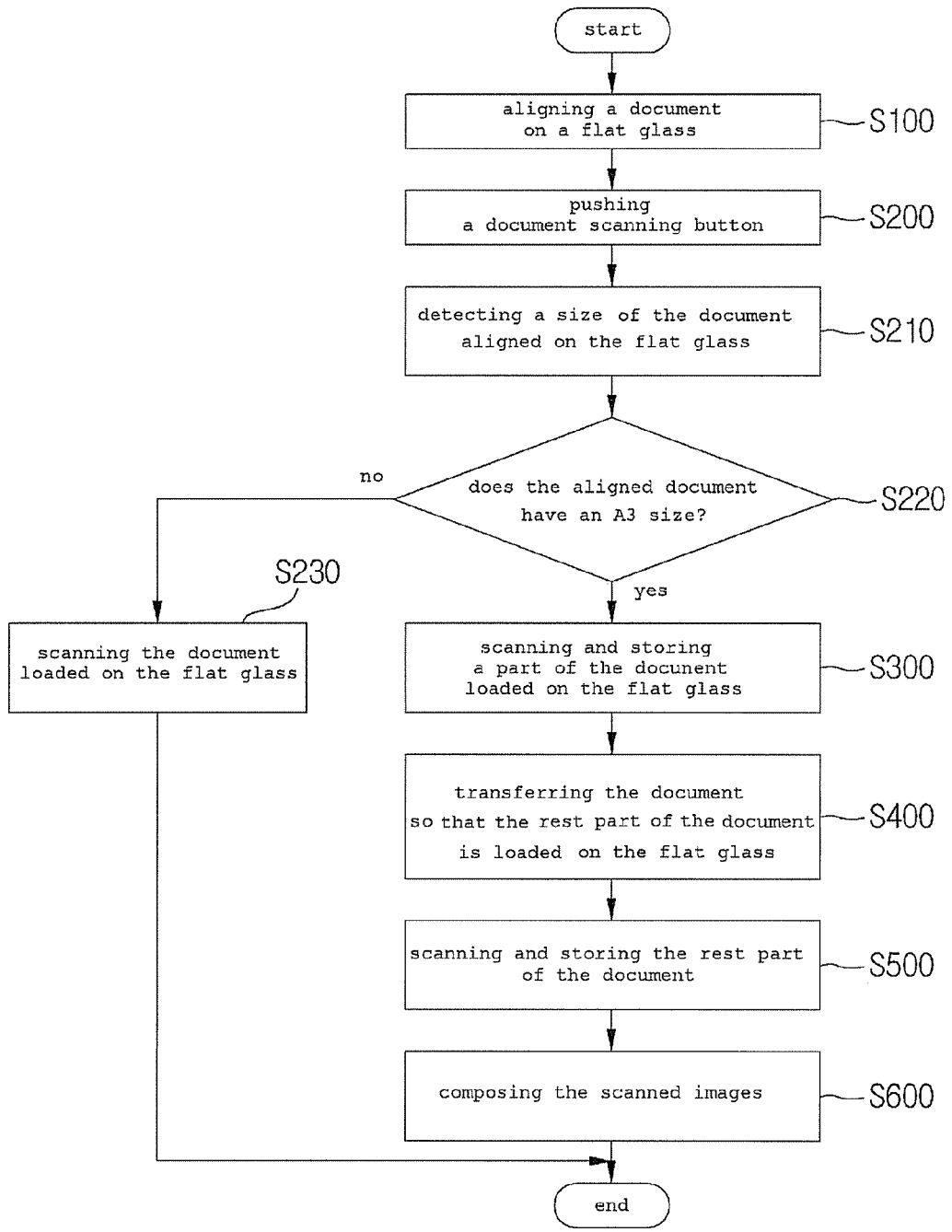
FIG. 5 is a flow chart showing a scanning method of the image forming apparatus with the function of scanning the A3-sized document in accordance with the embodiment of the present invention.

FIG. 5 is a flow chart showing a scanning method of the image forming apparatus with the function of scanning the A3-sized document in accordance with the embodiment of the present invention.

Firstly, the A3 document is aligned on the flat glass 110 by a user so that the short side (210 mm) of the document is contacted with the transferring roller member 220 (S100). And, when the document scanning button 420 is pushed (S200), the document size detecting sensor 422 detects a size of the document aligned on the flat glass 110 and then outputs a signal to the controlling part 430 (S210).

Then, it is determined by the controlling part 430 whether the aligned document has the A3 size on the basis of the signal received from the document scanning button 420 (S220).

As a result, if the size of the document is over an extent of the scanning capacity of the scanning sensor 312, i.e., the A3 size, the controlling part 430 receives the signal from the document scanning button 420 and then outputs the signal to the scanning sensor 312 so as to scan a part of the A3 document 10 loaded on the flat glass 110.

And the scanning sensor 312 is reciprocated at a lower side of the flat glass 110 so as to scan the A3 document loaded on the flat glass 110. Then, the scanning part 310 outputs a first image data having a slight larger size than a half of the A3 document, and the first image data is stored in the image storing part 320 (S300).

Then, after desired time is passed, the controlling part 430 outputs a signal to the transferring roller driving motor 230 so as to rotate the transferring roller member 220. If the transferring roller member 220 is rotated, the rest part of the A3 document that is not scanned yet is transferred to the side of the transferring roller member 220 and loaded on the flat glass 110, and the already scanned part of the A3 document is exposed to the outside through the document output port 122 formed between the main body 100 and the cover 120 (S400).

Then, the controlling part 430 outputs a signal to the scanning sensor 312 so as to scan the rest part of the A3 document loaded on the flat glass 110, and thus the scanning sensor 312 is reciprocated again at the lower side of the flat glass 110 so as to scan the A3 document loaded on the flat glass 110 (S500). Therefore, the scanning part 310 outputs a second image data having a slight larger size than a half of the A3 document, and the second image data is stored in the image storing part 320.

If the scanning operation of the A3 document is finished, an image processing part 300 carries out the image processing operation so as to compose the scanned two image data and generate an image of the A4 size (S600).

On the other hand, as a result from the document size detecting sensor 422, if the size of the document is within an extent of the scanning capacity of the scanning sensor 312, i.e., the A4 size, the controlling part 430 receives the signal from the document scanning button 420 and then outputs the signal to the scanning sensor 312 so as to scan the A4 document 10 loaded on the flat glass 110.

And the scanning sensor 312 is reciprocated at a lower side of the flat glass 110 so as to scan the A4 document loaded on the flat glass 110. Therefore, the scanning operation of the A4 document is completed (S230).

As described above, it is possible to selectively scan the A4 or A3 document by controlling the operation of the scanning sensor 312 and the transferring roller driving motor 230.

Figure 6:
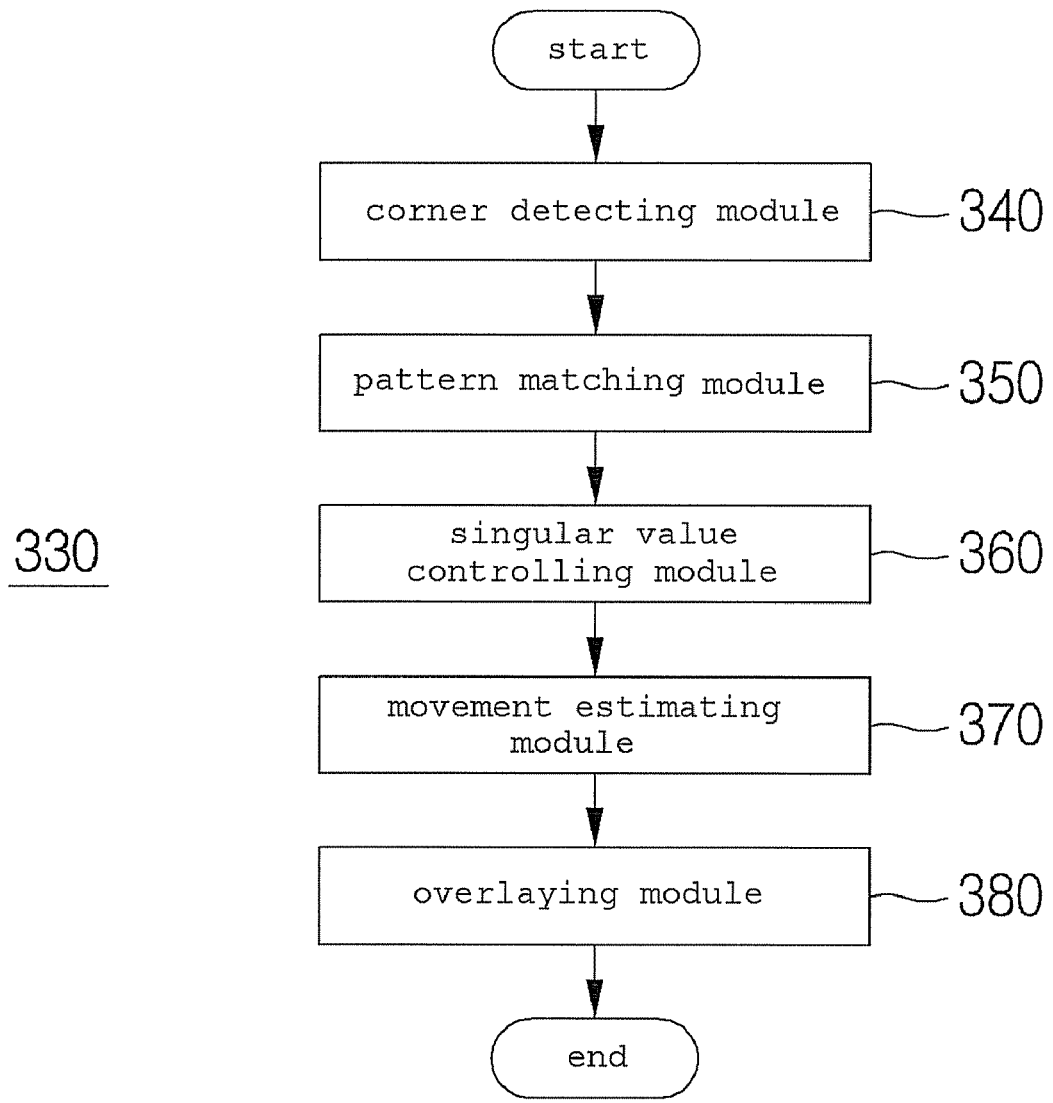
FIG. 6 is a block diagram showing a construction of an image composing part which can be applied to the image forming apparatus of FIG. 4.
Figure 7B:
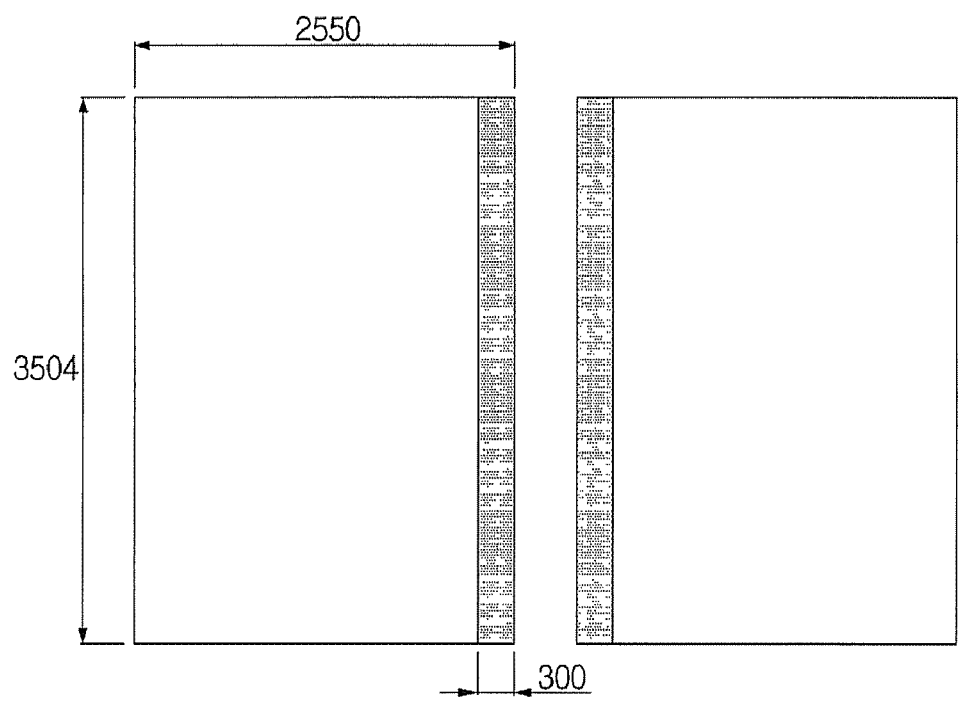
FIG. 7b is a view showing overlaid regions of scanned images in the present invention.
Figure 8:
FIG. 8 is a view of explaining corners of an image in the overlaid region in accordance with the present invention.
Figure 8:
Figure 9:
FIG. 9 is a view showing connection of corresponding points among the corners of the image in the overlaid region in accordance with the present invention.
Figure 10:
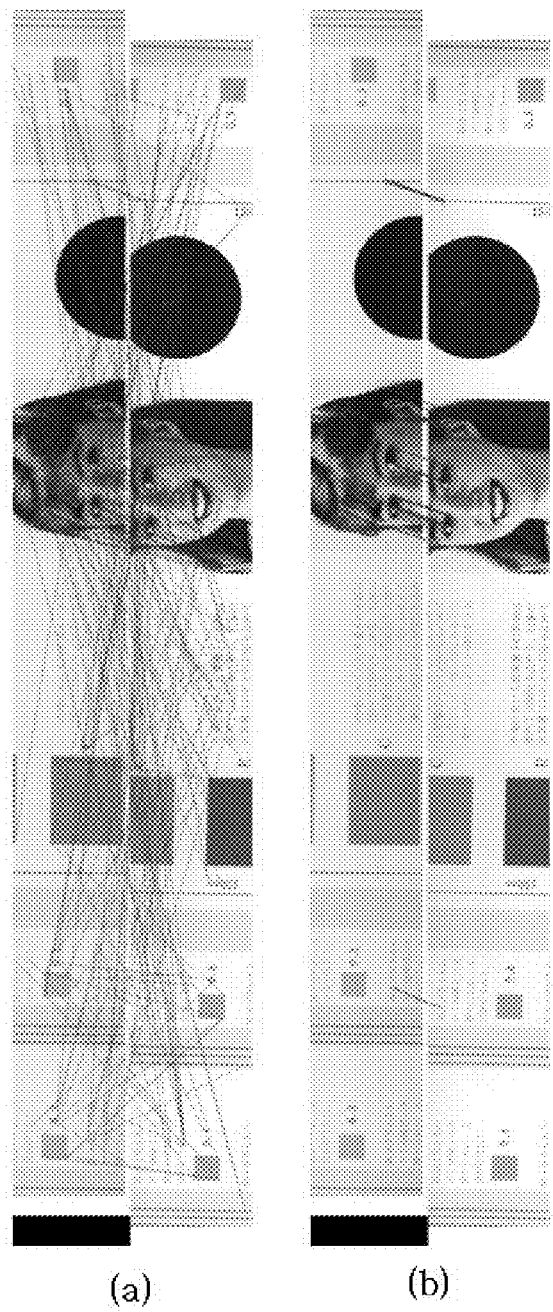
FIG. 10 is a view showing states before and after removing erroneous corresponding relations in accordance with the present invention.

FIG. 6 is a block diagram showing a construction of an image composing part which can be applied to the image forming apparatus of FIG. 4, FIG. 7b is a view showing overlaid regions of scanned images in the present invention, FIG. 8 is a view of explaining corners of an image in the overlaid region in accordance with the present invention, FIG. 9 is a view showing connection of corresponding points among the corners of the image in the overlaid region in accordance with the present invention, and FIG. 10 is a view showing states before and after removing erroneous corresponding relations in accordance with the present invention.

As shown in FIG. 6, the image composing part 330 includes a corner detecting module 340, a pattern matching module 350, a singular value controlling module 360, a movement estimating module 370 and an overlaying module 380.

The corner detecting module 340 overlays some regions corresponding to 300 pixels of each of the scanned first and second image data, and then carries out a Harris corner detection algorithm in the overlaid regions. Preferably, each of the overlaid regions corresponds with 300 pixels (1 inch). If the number of pixels is reduced, it is possible to reduce calculation time and occupation of memory. However, in case of the images having a serious skew, the composing thereof may be failed.

Herein, a corner of pattern in an image of the overlaid region is a point that two edges of pattern in the image. FIG. 8a shows an image of the overlaid region, and FIG. 8b shows corners found by applying the Harris corner detection algorithm to the image of the overlaid region of the FIG. 8a. In other words, red points in FIG. 8b are the corners found by applying the Harris corner detection algorithm. These corners can be easily found regardless of change in brightness of an image, rotation, skew and the like.

Meanwhile, in order to detect the corners that is strong with respect to noise, after the overlaid region is processed by a Gaussian blur and then differentiated, a Harris matrix A(x) is calculated by applying the Harris corner detection algorithm using a resultant value. A point that an eigen value of the Harris matrix calculated as described above is maximized in a certain region is the Harris corner.

In order to calculate the Harris corner, it is necessary to perform twice the calculation of the Gaussian blur. The calculation of the Gaussian blur is basically a floating-point operation and a core factor that decides a Harris corner detection speed. Preferably, the Gaussian blur with respect to an image in the overlaid region is carried out in a status that the floating-point operation is changed into an integer operation.

The pattern matching module 350 is a factor for finding a corresponding point among the corners. FIG. 9 shows an example of pattern matching between the first and second images.

The pattern matching module 350 firstly forms a local descriptor, which describes characteristics of a corner portion, using information around the corner so as to perform the pattern matching. That is, the pattern matching module 350 firstly forms a local descriptor which can perform the matching with respect to various changes in image rotation and size before connection of corresponding points among the corners of the image in the overlaid region. The pattern matching module 350 compares the local descriptor in the overlaid region and connects the most similar points to each other. Since the change in brightness or occlusion that may be occurred in the twice-performed scanning operations can be overcome due to the pattern matching, it is possible to increase precision of the image composing algorithm.

The singular valve controlling module 360 eliminates erroneous corresponding relations using a random sampling algorithm, thereby finding consistent matching points.

Since the local descriptor just uses a narrow extent of information and does not consider an entire relationship of the image, a large quantity of erroneous corresponding relations may be included. Therefore, the singular valve controlling module 360 functions to eliminate the erroneous corresponding relations using the random sampling algorithm, thereby finding matching points. The random sampling algorithm estimates a solution from some samples that are randomly selected, and then checks whether the rest elements are consistent with the solution. This process is repeated the desired number of times or adaptively so as to obtain the most proper solution and the effective corresponding relations.

Theoretically, the random sampling algorithm should be repeated the following number of times N in order to succeed in a probability of p (e.g., 0.99), $$N = \frac{\log(1-p)}{\log(1-(1-\varepsilon)^m)}$$

wherein $\varepsilon$ is a proportion of the erroneous corresponding relation, and m is the minimum number of samples that is needed to estimate the solution. Therefore, in order to reduce a calculation amount of the random sampling algorithm, it is necessary to reduce m, and thus it is possible to obtain a proper result even in a high proportion of the erroneous corresponding relation. A four-point algorithm is used between the images of the overlaid region, but it is preferable to use a two-point algorithm in order to reduce the calculation amount. FIG. 10*a* shows the corresponding relations before performing the random sampling algorithm, and FIG. 10*b* shows the corresponding relations after performing the random sampling algorithm wherein all of the erroneous corresponding relations are eliminated.

The movement estimating module 370 functions to find a geometric movement parameter of the images of the overlaid region.

The geometric relationship between the images in the overlaid is classified into translation, Euclidean, similarity, affine and projective according to complexity thereof.

Among them, the translation generated between the images of the overlaid region when the A3 document is scanned twice can be sufficiently modeled into the similarity including the rotation and skew.

The following table shows a parameter for each movement and the number of free variables necessary to calculate it.

| Movement | Degree of freedom |
| --- | --- |
| Translation | 2 |
| Euclidean | 3 |
| Similarity | 4 |
| Affine | 6 |
| Projective | 8 |

Referring to the above table, the similarity needs 4 free variables, and thus the movement parameter can be obtained through minimum two matching points.

The overlaying module 380 functions to compensate and align the rotation and skew using the parameter for geometric movement of the image in the overlaid region. Further, in order for an overlapped portion between the images of the overlaid region to be seen naturally, a stitching operation is applied using a dynamic programming.

The rotation and skew of the two images can be easily compensated and aligned by warping a second image with a first image using the movement parameter obtained from the movement estimating module 370. Herein, the stitching operation has a large calculation amount in order to allow the overlapped portion of the two images to be naturally seen.

In the scanning of the A3 document, since the same scanning sensor 312 is used twice, there is hardly the change in brightness between the two images. Therefore, by using only the stitching operation, it can be possible to obtain the enough quality without a blending operation having a large calculation amount. In other words, the image is most naturally seen when the overlapped portions are interlinked along the most similar parts. For example, when the images are composed on the basis of a white background of paper, it is possible to obtain the most natural result. In order to find such a seam, the dynamic programming having a relatively small calculation amount is used. In the dynamic programming, when obtaining a solution of an optimization problem, the problem is divided into a plurality of parts and then each part is optimized, whereby the entire problem is optimized. Herein, when the seam is decided, an uppermost point is adapted to follow the most similar point among three directional points that are respectively directed downward, thereby obtaining the optimized solution.

Figure 11:
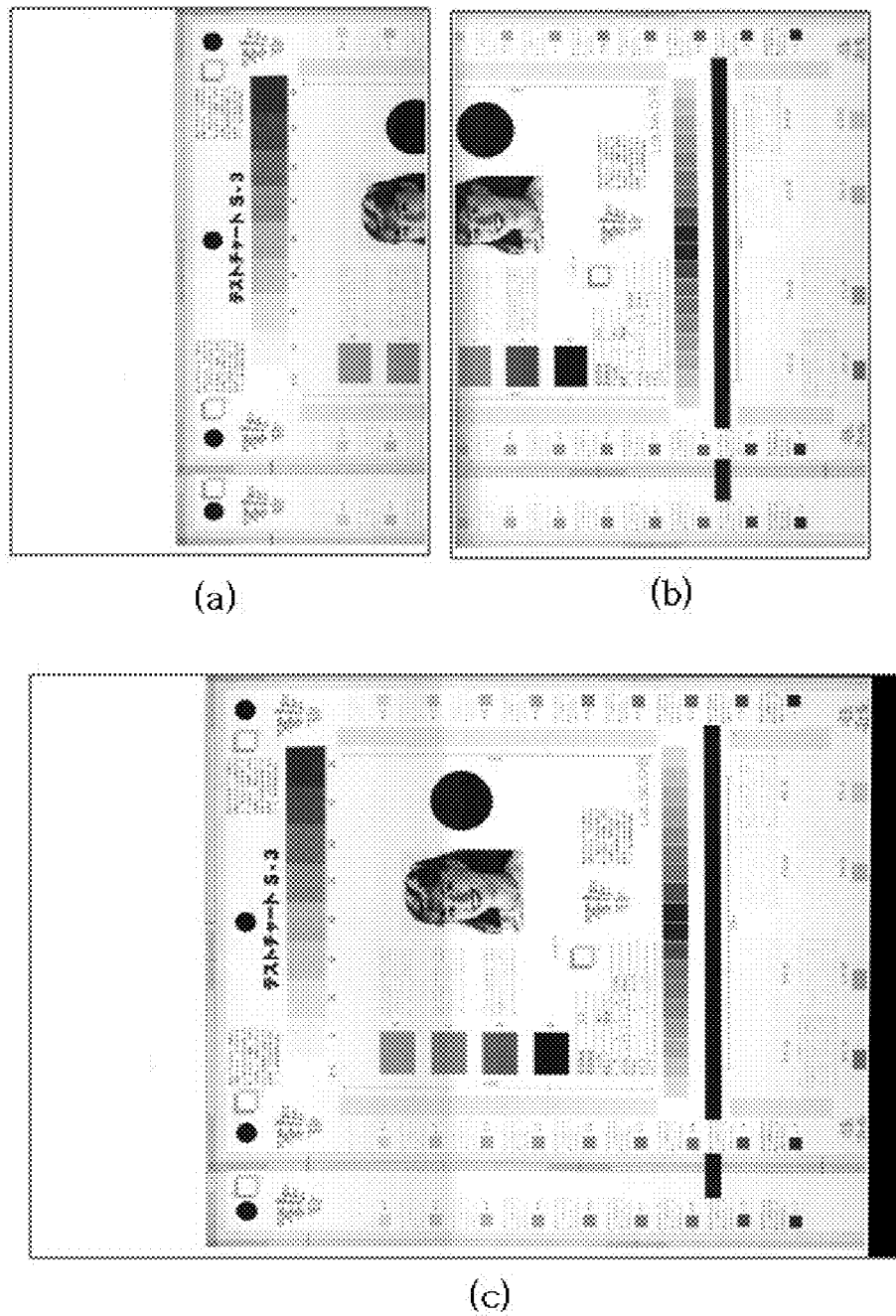
FIG. 11 is a view showing an example of the image composing in accordance with an embodiment of the present invention.

FIG. 11 is a view showing an example of the image composing in accordance with an embodiment of the present invention.

FIG. 11*a* shows the first image that is scanned in the first region of the A3 document to have a larger size than the A4 size by the scanning sensor 312, and FIG. 11*b* shows the second image that is scanned in the second region of the A3 document to have a larger size than the A4 size by the scanning sensor 312, and FIG. 11*c* shows an image of an A3 document generated by composing the first and second images using the image composing part 330.

Figure 12:
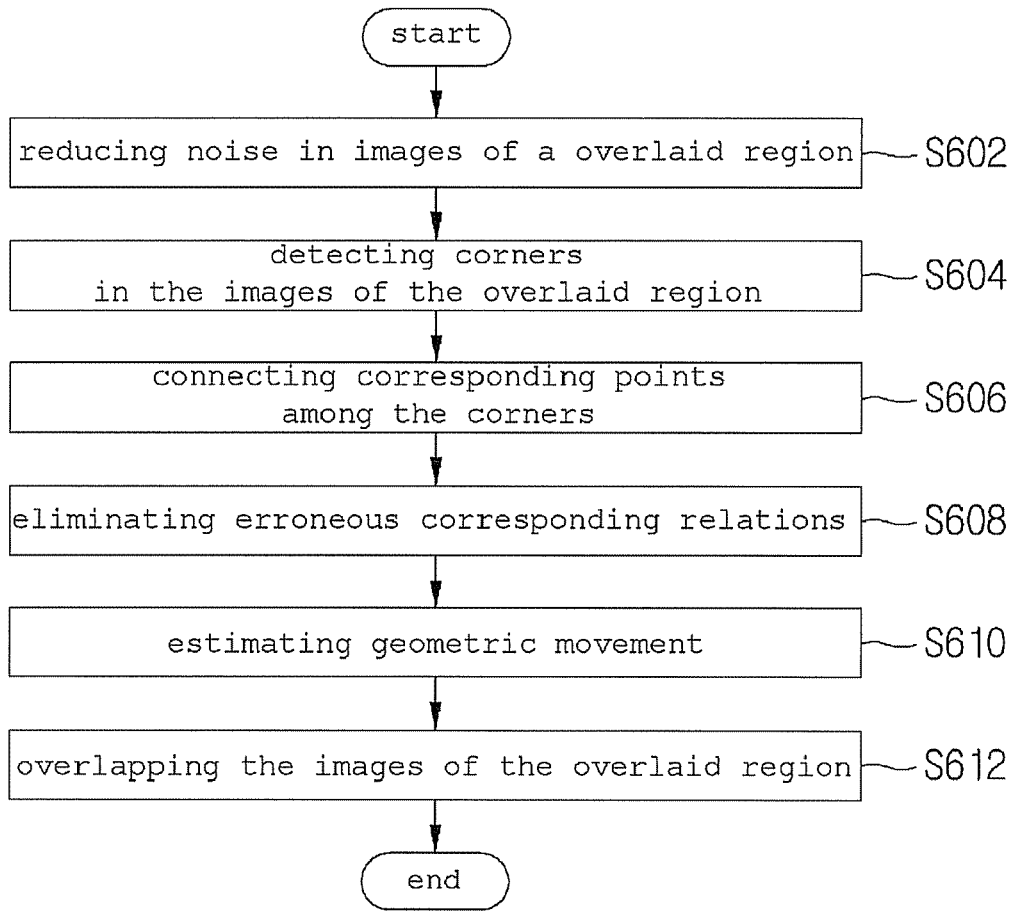
FIG. 12 is a flow chart showing an image composing method in accordance with an embodiment of the present invention.

FIG. 12 is a flow chart showing an image composing method in accordance with an embodiment of the present invention.

Firstly, the controlling part 430 controls the first and second image data stored in the image storing part 320 to be interlocked with the image composing part 330. The image composing part 330 reads the overlaid regions of the first and second image data and then carries out the Gaussian blur with respect to the images of the overlaid regions so as to reduce influence of noise in the overlaid regions (S602).

The image composing part 330 detects the corners in the image patterns of the overlaid region using the Harris corner detection algorithm (S604).

The image composing part 330 forms the local descriptor for performing the matching with respect to the various changes in image rotation and size, and then connects the corresponding points between the corners of the overlaid regions (S606).

And also using the random sampling algorithm, the image composing part 330 eliminates the erroneous corresponding relations in order to find the consistent matching points according to the use of the local descriptor (S608).

Then, the image composing part 330 finds the geometric movement parameter of the images of the overlaid region and then estimates the geometric movement (S610).

Finally, the image composing part 330 compensates and aligns the rotation and skew using the geometric movement parameter, and then overlaps the images of the overlaid region by applying the stitching operation using the dynamic programming so that the overlapped portion of the overlaid regions can be naturally seen (S612).

The present invention can be also applied to any other image forming apparatuses which scan a document having a double size of a scanning capacity of its scanning sensor, for example, an image forming apparatus for scanning an A2 document using a scanning sensor having an A3 size.

According to the image forming apparatus with a scanning function and the scanning method thereof according to the present invention, it is possible to scan a document having a larger size than the flat glass, thereby remarkably reducing a manufacturing cost thereof.

Further, according to the present invention, it is possible to optimally overlapping the images in the overlaid regions, thereby obtaining a high quality of image.

While the present invention has been described with respect to the specific embodiments, it will be apparent to those skilled in the art that various changes and modifications may be made without departing from the spirit and scope of the invention as defined in the following claims.

What is claimed is:

1. An image forming apparatus having a function of scanning a document having a larger size than a flat glass, comprising:
   a motor driving part for controlling a transferring roller driving motor which drives a transferring roller for transferring a second-sized document from a first region of the second-sized document to a second region of the second-sized document, in a scanning mode for the second-sized document larger than the first-sized document which can be scanned through the flat glass;
   a scanning part which scans the first region of the second-sized document loaded on the flat glass so as to have a larger width than the first-sized document and outputs a first image data, and also scans the second region of the second-sized document transferred by the transferring roller and loaded on the flat glass so as to have a larger width than the first-sized document and outputs a second image data;
   an image storing part for storing the first and second image data output from the scanning part; and
   an image composing part which performs a matching of image patterns using an overlaid region selected from the first and second image data, and overlaps images of the overlaid region so as to form an image having the same size as the second-sized document.

2. The image forming apparatus of claim 1, wherein the image composing part detects corners of patterns in the images of the overlaid region in order to perform the matching of the image patterns, and connects corresponding points among the corners of the overlaid region.

3. The image forming apparatus of claim 2, wherein the image composing part uses a Harris corner detection algorithm in the overlaid regions so as to detect the corners of the image patterns of the overlaid region.

4. The image forming apparatus of claim 3, wherein the image composing part performs a Gaussian blur with respect to the images of the overlaid region in order to reduce influence of noise in the overlaid region before detecting of the corners of the overlaid region.

5. The image forming apparatus of claim 4, wherein the Gaussian blur is carried out in a status that a floating-point operation with respect to the images of the overlaid region is changed into an integer operation.

6. The image forming apparatus of claim 2, wherein the image composing part forms a local descriptor which is used for the matching with respect to various changes in image rotation and size before the connecting of the corresponding points among the corners of the image in the overlaid region.

7. The image forming apparatus of claim 6, wherein the image composing part eliminates erroneous corresponding relations using a random sampling algorithm in order to find the consistent matching points according to the use of the local descriptor.

8. The image forming apparatus of claim 1, wherein the image composing part finds a geometric movement parameter of the images of the overlaid region after performing the matching of the image patterns.

9. The image forming apparatus of claim 8, wherein the overlapping of the images of the overlaid region compensates and aligns the rotation and skew using the parameter for geometric movement of the image in the overlaid region.

10. The image forming apparatus of claim 9, wherein the overlapping of the images of the overlaid region applies a stitching using a dynamic programming so that an overlapped portion of the overlaid regions shows less noticeable stitching boundary.

11. A scanning method of an image forming apparatus which comprises a flat glass on which a document to be scanned is loaded, a transferring roller for transferring the document, and a scanning sensor for scanning an image from the document loaded on the flat glass, comprising:
   scanning a first region of a second-sized document, which is loaded on the flat glass, so as to have a larger width than a first-sized document in a scanning mode for the second-sized document larger than the first-sized document which can be scanned through the flat glass, and outputting a first image data;
   transferring the second-sized document from the first region of the second-sized document to the second region of the second-sized document using the transferring roller, and scanning the second region of the second-sized document transferred by the transferring roller and loaded on the flat glass so as to have a larger width than the first-sized document, and outputting a second image data; and
   performing a matching of image patterns using an overlaid region selected from the first and second image data, and overlapping images of the overlaid region so as to form an image having the same size as the second-sized document.

12. The scanning method of claim 11, wherein the forming of the image having the same size as the second-sized document detects corners of patterns in the images of the overlaid region in order to perform the matching of the image patterns, and connects corresponding points among the corners of the overlaid region.

13. The scanning method of claim 12, wherein the forming of the image having the same size as the second-sized document performs a Gaussian blur with respect to the images of the overlaid region in order to reduce influence of noise in the overlaid region before detecting of the corners of the overlaid region.

14. The scanning method of claim 13, wherein the forming of the image having the same size as the second-sized document forms a local descriptor which can perform the matching with respect to various changes in image rotation and size before the connecting of the corresponding points among the corners of the image in the overlaid region.

15. The scanning method of claim 14, wherein the forming of the image having the same size as the second-sized document eliminates erroneous corresponding relations using a random sampling algorithm in order to find the consistent matching points according to the use of the local descriptor.

16. The scanning method of claim 15, wherein the forming of the image having the same size as the second-sized document finds a geometric movement parameter of the images of the overlaid region after performing the matching of the image patterns.

17. The scanning method of claim 16, wherein the overlapping of the images of the overlaid region compensates and aligns the rotation and skew using the parameter for geometric movement of the image in the overlaid region.

18. The scanning method of claim 17, wherein the overlapping of the images of the overlaid region applies a stitching using a dynamic programming so that an overlapped portion of the overlaid regions can be naturally seen.

* * * * *